No. 866,758. PATENTED SEPT. 24, 1907.
O. A. WHEELER.
ART OR PROCESS OF RECLAIMING SCRAP OR WASTE VULCANIZED RUBBER.
APPLICATION FILED OCT. 11, 1906.
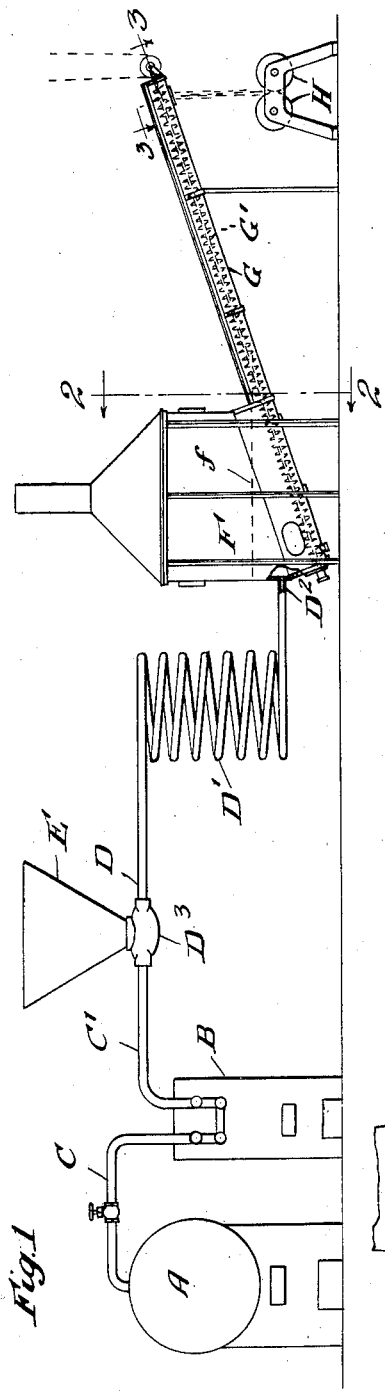
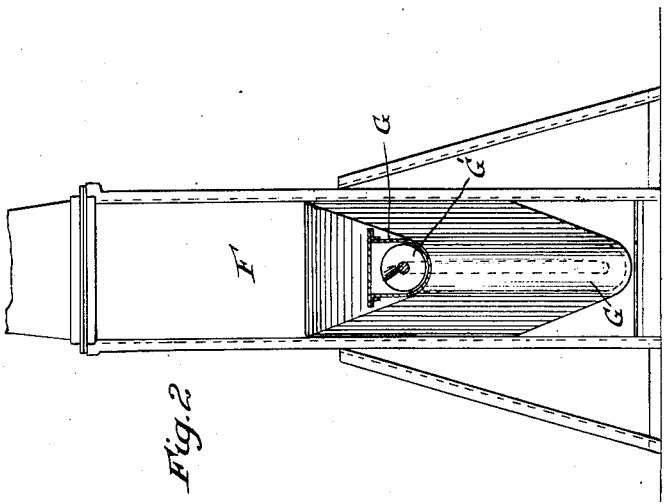
Witnesses:
Inventor:
Orrin A. Wheeler
By Munday, Evarts, Adcock & Clarke.
Attorneys

UNITED STATES PATENT OFFICE.

ORRIN A. WHEELER, OF AUSTIN, ILLINOIS, ASSIGNOR TO HIMSELF, AND FRED W. GARLICK, CHARLES I. BEAR, AND WILLIAM A. VAIL, OF CHICAGO, ILLINOIS.

ART OR PROCESS OF RECLAIMING SCRAP OR WASTE VULCANIZED RUBBER.

No. 866,758.        Specification of Letters Patent.        Patented Sept. 24, 1907.

Application filed October 11, 1906. Serial No. 338,428.

*To all whom it may concern:*

Be it known that I, ORRIN A. WHEELER, a citizen of the United States, residing in Austin, in the county of Cook and State of Illinois, have invented a new and useful Improvement in the Art or Process of Reclaiming Scrap or Waste Vulcanized Rubber, of which the following is a specification.

My invention relates to improvements in the art or process of reclaiming scrap or waste vulcanized rubber. The methods or processes heretofore in use for reclaiming rubber from scrap or waste rubber are slow and expensive in operation and result in an inferior product unsuitable for most uses. The processes or methods heretofore most generally employed, consist essentially in first grinding the rubber scrap or waste and then heating it in large quantities or masses in water or steam for a considerable time, usually from ten to twenty-six hours, as the rubber waste being a very poor heat conductor, the heat penetrates slowly to the interior portions of the mass of ground waste and it takes time to raise the interior portions to the temperature required to produce plasticity, after which the hot wet plastic rubber waste is cooled and dried frequently by forcing air through the mass, as it is a tedious and difficult matter to dry it. The reclaimed product produced by such processes is of inferior and unsatisfactory character. This is due in part to the fact that all vulcanized rubber contains, as is well known, free sulfur so that the prolonged heating to which the rubber is subjected in such operations necessarily produces a further vulcanizing action; and in part to oxidation, which, as is well known, is the greatest foe of india rubber and which takes place to a material extent during such processes by reason of the prolonged heating in the presence of oxygen.

The object of my invention is to provide a simple and efficient process for reclaiming scrap or waste vulcanized rubber by means of which the work may be done rapidly and cheaply without oxidation taking place during the operation and without causing further vulcanization of the rubber waste being treated by reason of the free sulfur present therein; so that the reclaimed rubber produced by my process may not only be rapidly and cheaply manufactured, but also be of a superior quality capable of being revulcanized and reworked and but slightly inferior to the original compound or new rubber itself.

After long and extensive experimenting, I have discovered, and herein my invention primarily consists that old rubber stock, scrap or waste may be practically reclaimed or given the necessary plasticity for revulcanization and reworking by subjecting such old rubber stock, waste or scrap for a very short time, a few seconds, to a degree of heat just above the limits of the vulcanization range and below that of fusion, about 600° Fht., and that the duration of this temperature for the shortest possible time produces the best results, and that by suddenly raising the old rubber stock or waste to such temperature and again quickly cooling it, no further vulcanization of the rubber will occur during the operation (time being necessary for vulcanization, as is well known), and that oxidation during the treatment will also in this way be prevented.

In practicing my invention, old rubber stock, scrap or waste is suddenly or quickly raised to the required degree of heat to produce plasticity or its reclamation by subjecting it in a ground or pulverulent condition, preferably, to a blast or moving current of heated fluid under pressure and in a confined passage, preferably superheated steam, so that the hot fluid comes directly in contact with every particle of the ground rubber and thus almost instantaneously raising it to the required temperature. The superheated steam or hot fluid under pressure also thus serves as the means for forcing or conveying the ground rubber stock through the confined passage or pipe. In this way I not only very quickly or suddenly raise the temperature of the old rubber stock to be treated to the required temperature, but also insure uniform and proper heating of every particle of the ground rubber stock. By increasing or diminishing the length of the confined passage or pipe through which the rubber stock is forced or carried by the superheated steam, each particle of the ground rubber stock may be subjected to the heat for a greater or less length of time. I then quickly cool the ground rubber stock, this being preferably done in part as it passes through a cooling portion or extension of the confined passage or pipe, and in part by discharging it into water or other cooling medium in a confined vessel to more effectually prevent oxidation. The reclaimed rubber is then passed or conveyed directly from the cooling chamber to the sheeting rolls and sheeted.

In practicing my invention, I take the old vulcanized rubber scrap or waste and grind it in any suitable way to a fine or pulverulent state, and if it contains fiber, dirt or other foreign matter, (such as old shoes, pneumatic tires, hose, etc., usually contain,) I separate the ground rubber stock from such fiber or foreign matter, preferably by sifting and blowing it in any suitable manner. I then put the ground and cleaned rubber stock into a suitable hopper or feed device communicating with a confined passage or pipe into which the ground rubber stock may be evenly and continuously fed. As the ground rubber stock feeds into this confined passage or pipe, which is preferably arranged in a substantially horizontal position, it is subjected to a jet, blast or current of superheated steam which operates to draw, carry, convey or force the ground vulcanized rubber stock through such pipe or passageway and raise the temperature of each particle of the rubber stock to the required degree to produce plasticity or reclamation. The further end of the confined passage or pipe is preferably in a coiled form, the pipe being of such length that the steam is partly condensed in the discharge portion thereof, so that the ground rubber stock will fill and close this portion of the pipe and issue in a plastic form therefrom at the exhaust end. The ground rubber stock will thus become greatly reduced in temperature before issuing from the pipe and it may then be further reduced in temperature by discharging it into water in a closed cooling chamber at the exhaust end.

To enable my invention to be more readily understood and practiced by those skilled in the art, I have in the accompanying drawing shown at Figure 1, a side elevation of an apparatus suitable for use in practicing my invention. Fig. 2 is a vertical section on line 2—2 of Fig. 1: Fig. 3 is a detail section on line 3—3 of Fig. 1: and Fig. 4 is a detail section through the confined passage or pipe at the feed portion thereof.

In the drawing, A represents a steam boiler; B a super-heater to further heat the steam before it passes through the confined passage or pipe, C a steam pipe leading from the boiler to the super-heater and D the confined passage or pipe connecting with the super-heater through the steam pipe C' and in which the ground old vulcanized rubber stock is subjected momentarily to the required temperature to produce plasticity or reclamation of the old vulcanized rubber, this passage or pipe having a coiled portion $D^1$ at its discharge end $D^2$.

E is the feed hopper for the ground rubber stock, F a cooling chamber in which the momentarily heated rubber stock is discharged from the pipe D.

G is a conveyer pipe or trough furnished with a screw conveyer $G^1$ for moving the treated rubber stock from the cooling chamber and delivering it to the sheeting rolls H.

As the ground rubber stock X feeds into the confined passage or steam pipe D through the feed passage $E^1$, each particle of the ground stock comes directly in contact with the blast or moving current of superheated steam under pressure, and is forced by the steam through said confined passage or pipe, and the temperature of each particle is quickly raised to the required degree to produce plasticity or reclamation of the rubber, preferably about 600 degrees Fahrenheit. The confined passage or pipe D is preferably about two inches in diameter and preferably about one hundred feet in length, a portion of it being coiled so that the apparatus will occupy less room. The discharge end $D^2$ of the pipe D in practice will become closely full of the plastic rubber, thus excluding air; and the steam also effectually excludes air from the ground rubber under treatment. Each particle of the ground rubber as it comes in contact with the superheated steam is quickly or suddenly raised to the required temperature and the temperature gradually reduces in degree as the rubber approaches the discharge end of the pipe D. The cooling chamber F will contain water of condensation from the steam to the level indicated by the dotted line $f$, and this water also aids in cooling the ground rubber stock treated. The screw conveyer G $G^1$, as well as the cooling chamber is closed and thus substantially excludes the air from the hot rubber stock until the same becomes sufficiently cooled for sheeting. The elevator is arranged at an angle so that the water can drain away from the rubber before it is delivered to the sheeting rolls. The screw conveyer and the cooling chamber serve to cool or reduce the temperature of the rubber stock to the degree necessary for sheeting, and the conveyer delivers it directly to the sheeting rolls so that it is not at all injured by oxidation before sheeting.

By my process or method, scrap or waste vulcanized rubber may be very expeditiously and economically reclaimed, and the resulting product is one of superior quality and uniform texture, but slightly inferior to native or new rubber, and may be revulcanized and reworked the same as new or native rubber and used for most purposes for which new or native rubber is now required.

The discharge end or nozzle $C^2$ of the steam inlet pipe $C^1$ preferably projects slightly into the feed end of the confined passage or pipe D to aid in feeding or drawing the ground rubber stock into the pipe D on the principle of a steam injector. An enlarged thimble or coupling $D^3$ connects the steam inlet pipe $C^1$ and the confined passage or pipe D.

As in my process the ground particles of rubber stock are separated from each other by the jet or blast and individually carried along in it, and each separately and individually acted upon from all sides by the hot steam or fluid, instead of being compacted together, during the process of conversion or reclamation so that each and every particle is uniformly treated, thus resulting in a perfect reclamation of every particle and producing a product of very fine quality and much superior to other reclaimed rubber heretofore produced.

In practice, the superheater should raise the temperature of the steam coming from the boiler to about six hundred degrees Fahrenheit. The ground rubber stock which is fed or injected by the steam into the pipe D is preferably in a dry condition and as the steam itself is superheated, the ground rubber stock is practically subjected to a dry heat while the conversion or reclaiming operation is taking place. I find in practice that in this way old rubber stock may be very completely and very perfectly recovered or reclaimed, each particle of the ground rubber stock almost instantaneously, and that the operation may be performed very rapidly and cheaply.

I claim:—

1. The process of reclaiming scrap or waste rubber without oxidation or further vulcanization taking place, consisting in subjecting the same while moving through a confined passage in a current of heated fluid for a short period only to a temperature above the range of vulcanization and below that of fusion, substantially as specified.

2. The process of reclaiming scrap or waste vulcanized rubber, consisting in subjecting the old rubber stock in a ground condition while moving through a confined passage to the action of a blast or moving current of heated fluid under pressure, substantially as specified.

3. The process of reclaiming scrap or waste vulcanized rubber, consisting in subjecting the old rubber stock in a ground condition while moving through a confined passage to the action of a blast or moving current of heated fluid under pressure, to cause the particles of ground rubber to be quickly raised to the temperature necessary to produce plasticity, and then quickly cooling the same, substantially as specified.

4. The process of reclaiming scrap or waste vulcanized rubber, consisting in subjecting the old rubber stock in a ground condition to the action of a blast or moving current of heated fluid under pressure in a confined passage, through which the rubber stock particles are conveyed by said heated fluid substantially as specified.

5. The process of reclaiming scrap or waste vulcanized rubber, consisting in subjecting the old rubber stock in a ground condition to the action of a blast or moving current of heated fluid under pressure in a confined passage from which air is excluded, and through which the rubber stock particles are conveyed in and by said heated fluid substantially as specified.

6. The process of reclaiming scrap or waste vulcanized rubber, consisting in feeding the old rubber stock in a ground or pulverulent condition into a moving current of heated fluid under pressure, the ground rubber stock being held in suspension, heated and conveyed by said fluid substantially as specified.

7. The process of reclaiming scrap or waste vulcanized rubber, consisting in continuously feeding the old rubber stock in a ground or pulverulent condition into a moving current of heated fluid under pressure in a confined passage or pipe, the ground rubber stock being held in suspension, heated and conveyed by said fluid substantially as specified.

8. The process of reclaiming scrap or waste vulcanized rubber, consisting in continuously feeding the old rubber stock in a ground or pulverulent condition into a moving current of heated fluid under pressure the ground rubber stock being held in suspension, heated and conveyed by said fluid and then quickly cooling the same, substantially as specified.

9. The process of reclaiming scrap or waste vulcanized rubber, consisting in continuously feeding the old rubber stock in a ground or pulverulent condition into a moving current of heated fluid under pressure in a confined passage or pipe the rubber stock particles being heated and conveyed by said fluid and then quickly cooling the ground rubber stock, substantially as specified.

10. The process of reclaiming scrap or waste vulcanized rubber consisting in subjecting the old rubber stock in a ground or pulverulent condition while moving through a confined passage to the action of a blast or moving current of superheated steam under pressure, substantially as specified.

11. The process of reclaiming scrap or waste vulcanized rubber consisting in subjecting the old rubber stock in a ground or pulverulent condition while moving through a confined passage to the action of a blast or moving current of superheated steam under pressure and then quickly cooling the same, substantially as specified.

12. The process of reclaiming scrap or waste vulcanized rubber consisting in subjecting the old rubber stock in a ground or pulverulent condition while moving through a confined passage to the action of a blast or moving current of superheated steam under pressure and then sheeting the same, substantially as specified.

13. The process of reclaiming scrap or waste vulcanized rubber, consisting in continuously feeding the rubber stock in a ground or pulverulent condition into a blast of superheated steam under pressure in a confined passage or pipe through which the steam pressure forces the ground rubber stock and causes each particle thereof to be quickly and uniformly heated to the required degree to produce plasticity, substantially as specified.

14. The process of reclaiming scrap or waste vulcanized rubber, consisting in continuously feeding the rubber stock in a ground or pulverulent condition into a blast of superheated steam under pressure in a confined passage or pipe through which the steam pressure forces the ground rubber stock and causes each particle thereof to be quickly and uniformly heated to the required degree to produce plasticity, then quickly cooling the plastic or reclaimed rubber, substantially as specified.

15. The process of reclaiming scrap or waste vulcanized rubber, consisting in continuously feeding the rubber stock in a ground or pulverulent condition into a blast of superheated steam under pressure in a confined passage or pipe through which the steam pressure forces the ground rubber stock and causes each particle thereof to be quickly and uniformly heated to the required degree to produce plasticity, then quickly cooling the plastic or reclaimed rubber to the temperature necessary for sheeting and then sheeting the same, substantially as specified.

16. The process of reclaiming scrap or waste vulcanized rubber consisting in feeding or forcing the same in a ground condition in and by a fluid current through a narrow or confined passage or pipe and subjecting the ground rubber stock uniformly throughout passing through such passage or pipe to the temperature necessary to produce plasticity, substantially as specified.

17. The process of reclaiming scrap or waste vulcanized rubber consisting in feeding or forcing the same in a ground condition in and by a fluid current through a narrow or confined passage or pipe and subjecting the ground rubber stock uniformly throughout for a short time only while passing through such passage or pipe to the temperature necessary to produce plasticity, and then quickly cooling the same, substantially as specified.

18. The process of reclaiming scrap or waste vulcanized rubber consisting in feeding or forcing the same in a ground condition in suspension in a moving fluid through a narrow or confined passage or pipe and subjecting the ground rubber stock uniformly throughout for a short time only while passing through such passage or pipe to the temperature necessary to produce plasticity, the temperature of the rubber stock being first quickly raised to such degree, substantially as specified.

19. The process of reclaiming scrap or waste vulcanized rubber consisting in feeding or forcing the same in a ground condition in suspension in a moving fluid through a narrow or confined passage or pipe and subjecting the ground rubber stock uniformly throughout for a short time only while passing through such passage or pipe to the temperature necessary to produce plasticity, the temperature of the rubber stock being first quickly raised to such degree, and subsequently quickly cooled, substantially as specified.

20. The process of reclaiming scrap or waste vulcanized rubber consisting in feeding or forcing the same in a ground condition in and by a steam current through a narrow or confined passage or pipe and subjecting the ground rubber stock uniformly throughout for a short time only while passing through such passage or pipe to the temperature necessary to produce plasticity, then quickly cooling the same and then sheeting the same, substantially as specified.

21. The process of reclaiming scrap or waste vulcanized rubber consisting in feeding or forcing the same in a ground condition in and by a steam current through a narrow or confined passage or pipe and subjecting the ground rubber stock uniformly throughout for a short time only while passing through such passage or pipe to the temperature necessary to produce plasticity, the temperature of the rubber stock being first quickly raised to such degree and subsequently cooled, and then sheeting the same, substantially as specified.

22. The process of reclaiming scrap or waste vulcanized rubber consisting in first reducing such scrap or waste to a ground or pulverulent condition, then separating the ground rubber stock from the fiber or foreign matter, then feeding or forcing the ground rubber stock through a passage or pipe and subjecting it while moving therethrough in suspension in a fluid current to the temperature necessary to produce plasticity, substantially as specified.

23. The process of reclaiming scrap or waste vulcanized rubber consisting in first reducing such scrap or waste to a ground or pulverulent condition, then separating the ground rubber stock from the fiber or foreign matter, then feeding or forcing the ground rubber stock through a passage or pipe and subjecting it while moving therethrough in suspension in a fluid current to the temperature necessary to produce plasticity, then cooling it, substantially as specified.

24. The process of reclaiming scrap or waste vulcanized rubber consisting in first reducing such scrap or waste to a ground or pulverulent condition, then separating the ground rubber stock from the fiber or foreign matter, then feeding or forcing the ground rubber stock through a passage or pipe and subjecting it while moving therethrough in suspension in a fluid current to the temperature necessary to produce plasticity, then cooling it, and then sheeting it, substantially as specified.

25. The process of reclaiming scrap or waste vulcanized rubber, consisting in subjecting the old rubber stock in a ground condition while moving through a confined passage to the action of a blast or moving current of heated fluid under pressure, to cause the particles of ground rubber to be quickly raised to the temperature necessary to produce plasticity and then quickly cooling the same, then sheeting it, substantially as specified.

26. The process of reclaiming scrap or waste vulcanized rubber, consisting in continuously feeding the old rubber stock in a ground or pulverulent condition into a moving current of heated fluid under pressure the rubber stock particles being heated and conveyed by said heated fluid and then quickly cooling the same, and then sheeting the same, substantially as specified.

27. The process of reclaiming scrap or waste vulcanized rubber in a ground or pulverulent condition, consisting in subjecting the particles thereof individually while moving through a confined passage to the action of a heated fluid, substantially as specified.

28. The process of reclaiming scrap or waste vulcanized rubber in a ground or pulverulent condition, consisting in subjecting the particles thereof individually to the action of a heated fluid moving through a confined passage, while held in suspension therein and conveyed thereby substantially as specified.

ORRIN A. WHEELER.

Witnesses:
  H. M. MUNDAY,
  PEARL ABRAMS.